Jan. 12, 1926.
E. C. JOHNSON
HOG HOLDER
Filed June 18, 1925
1,569,496
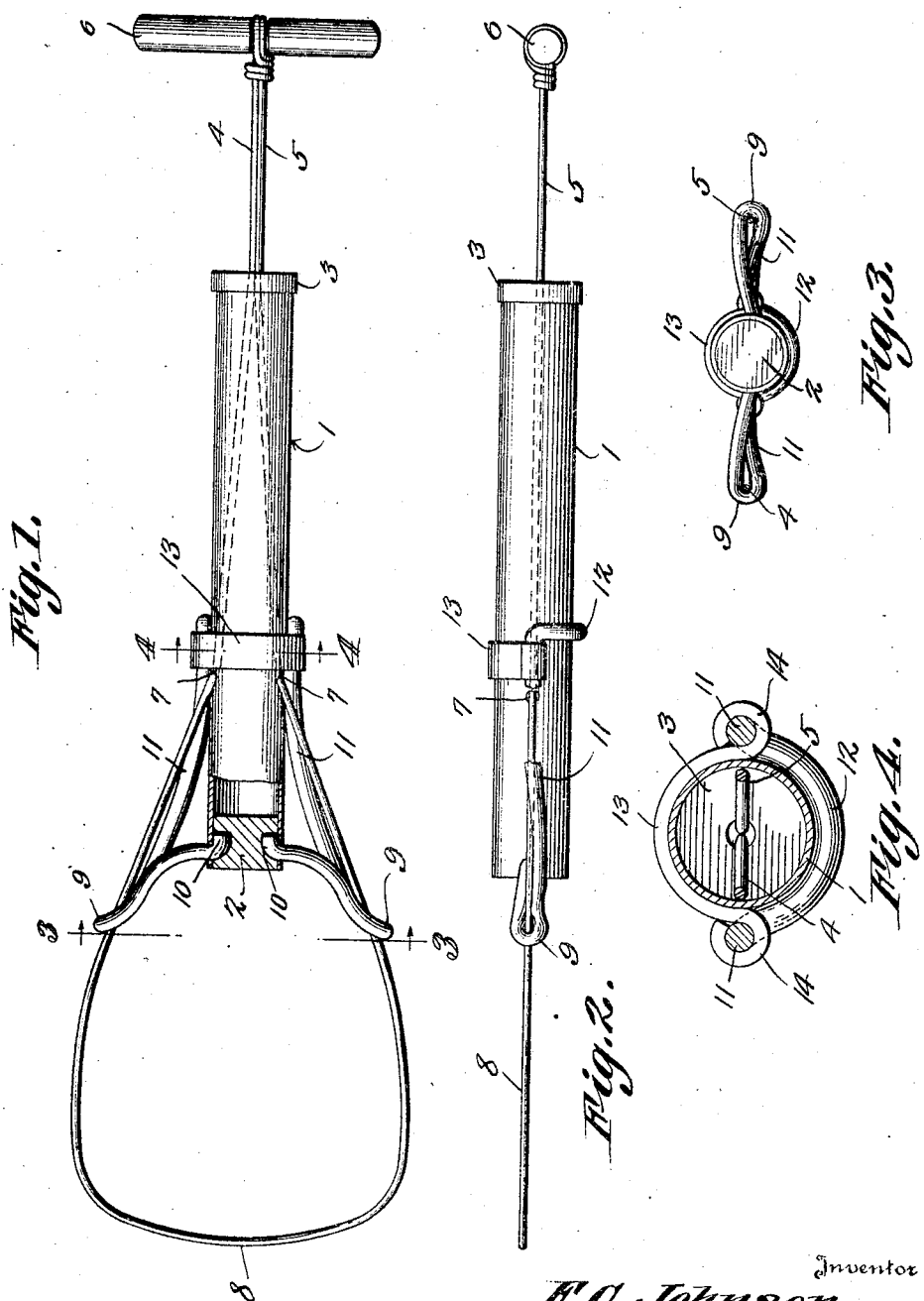
Inventor
E. C. Johnson
By C. A. Snow & Co.
Attorneys Patented Jan. 12, 1926.

1,569,496

UNITED STATES PATENT OFFICE.

EDWARD C. JOHNSON, OF IRETON, IOWA.

HOG HOLDER.

Application filed June 18, 1925. Serial No. 38,012.

*To all whom it may concern:*

Be it known that I, EDWARD C. JOHNSON, a citizen of the United States, residing at Ireton, in the county of Sioux and State of Iowa, have invented a new and useful Hog Holder, of which the following is a specification.

This invention relates to a catching or holding device for hogs or other animals.

The object of the invention is to provide a simple and efficient device which may be quickly and accurately engaged with the nose of a hog or similar animal and by exerting a pull thereon securely hold the animal for ringing or otherwise.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of the holder constituting this invention with parts broken out;

Figure 2 is a similar view taken on a plane at right angles to Figure 1;

Figure 3 is a transverse section taken on the line 3—3 of Figure 1; and

Figure 4 is a similar view taken on the line 4—4 of Figure 1.

In the embodiment illustrated, the holder constituting this invention comprises a tubular body member 1 having its front end closed by a block 2 and its rear end by a cap 3, said cap being apertured for the passage therethrough of the wires 4 and 5 which are connected at their outer ends to a hand grip 6 and extend longitudinally through the tube 1 and pass out therefrom at opposite sides thereof as shown at 7. These wires after passing through the apertures 7 diverge and form a loop 8 which is designed to encircle the nose of a hog or other animal and when a pull is exerted on handle 6 this loop will be contracted and securely hold the animal.

Guides for the arms or side members of the loop are formed by eyes 9 which extend laterally from the end of the member 1 which carries the plug closure 2. These eyes 9 are formed by twisting a small rod, the ends 10 of which are embedded in the plug 2 as is shown clearly in Figure 1. After these ends are extended outwardly and twisted to form the eyes 9 the rod is extended up substantially parallel with the sides of the tube as shown at 11 and the connected portion of said rods is bent into laterally extending U-shaped form as shown at 12. This U-shaped member 12 lies in close proximity to the body 1, and a metal cross bar or strap 13 extends around the other side of member 1 and has its ends bent to form eyes through which the members 11 extend and which operate to hold these members assembled on the body 1.

In the use of this device the parts being in the position shown in Figure 1 the loop 8 is placed so that the nose of the hog may be passed therethrough and then a pull is exerted on the handle 6 which contracts the loop 8 by drawing wires 4 and 5 through the tubular member 1 and closes the loop to securely clamp the animal's nose between it and the arms which carry the eyes 9.

While this device is primarily intended for holding or catching hogs obviously it may be used for other purposes and the loop 8 may be padded or covered with material to prevent its cutting into the flesh of the animal.

The handle 1 may be made of any desired length so that the implement may be operated at considerable distance from the animal.

I claim:—

1. A device of the class described comprising a tubular body member having a plug closure at one end and a cap closure at the other, a wire loop having the ends thereof extending through the sides walls of said body member and passing out through said cap closure, a hand grip securing the free ends of said wire, guides for the side members of the loop carried by said body member, and means for securing said guides to the body member.

2. In a device of the class described, a tubular body portion, a plug closing one end of the tubular body portion, a guide including a rod bent around the body portion and having its ends positioned within the plug, said guide comprising eyes formed intermediate the ends of the rod, a loop member extending through the eyes and extending through the body portion, and means for moving the loop member towards one end of the body portion.

In testimony that I claim the foregoing as my own, I have hereto affixed my signature.

ED. C. JOHNSON.